(12) United States Patent
Nakakuki

(10) Patent No.: US 7,420,623 B2
(45) Date of Patent: Sep. 2, 2008

(54) IMAGE-SIGNAL PROCESSING APPARATUS FOR ENHANCING SPECIFIC FREQUENCY COMPONENT OF IMAGE SIGNAL AND CORRECTING THE EDGE OF REPRODUCED IMAGE

(75) Inventor: Toshio Nakakuki, Mizuho (JP)

(73) Assignee: Sanyo Electrical Co., Ltd., Moriguchi-shi (JP)

( * ) Notice: Subject to any disclaimer, the term of this patent is extended or adjusted under 35 U.S.C. 154(b) by 477 days.

(21) Appl. No.: 11/070,264

(22) Filed: Mar. 3, 2005

(65) Prior Publication Data

US 2005/0200760 A1    Sep. 15, 2005

(30) Foreign Application Priority Data

Mar. 11, 2004  (JP)  ............... 2004-068299

(51) Int. Cl.
*H04N 5/21* (2006.01)
(52) U.S. Cl. ............... 348/625; 348/607; 348/624; 348/630
(58) Field of Classification Search ............... 348/625, 348/606, 607, 627, 630, 624, 254–256, 252, 348/674, 675; 382/254, 266; H04N 5/21, H04N 5/202, 9/69, 5/208
See application file for complete search history.

(56) References Cited

U.S. PATENT DOCUMENTS 6,618,097 B1 * 9/2003 Yamada ............... 348/625

6,909,813 B2 * 6/2005 Amano et al. ............... 382/266
6,990,250 B2 * 1/2006 Nakakuki ............... 382/266
7,130,483 B2 * 10/2006 Kim ............... 382/266
7,260,267 B2 * 8/2007 Sugimoto ............... 382/266
2003/0016880 A1   1/2003 Nakakuki

FOREIGN PATENT DOCUMENTS

JP    A-2003-032513    1/2003

\* cited by examiner

*Primary Examiner*—Sherrie Hsia
(74) *Attorney, Agent, or Firm*—Oliff & Berridge, PLC

(57) ABSTRACT

The structure of an image-signal processing apparatus for performing gamma correction and edge enhancement of a image signal is simplified. An edge-correction-gain generation circuit generates a gain signal according to the level of a image signal that has passed through an A-LPF on the basis of a preset transfer characteristic function. An edge-signal generation circuit generates an edge signal corresponding to the edge of the image according to the quadratic differential signal of the image signal. The edge signal is multiplied by the gain signal in a multiplying circuit. An edge-enhanced-signal generation circuit outputs it as an edge enhanced signal. The image signal is subjected to gamma correction by a gamma correction circuit in a different system from the edge-enhanced-signal generation circuit. A combining circuit combines the gamma-corrected image signal with the edge enhanced signal from the edge-enhanced-signal generation circuit.

8 Claims, 7 Drawing Sheets

IMAGE-SIGNAL PROCESSING APPARATUS FOR ENHANCING SPECIFIC FREQUENCY COMPONENT OF IMAGE SIGNAL AND CORRECTING THE EDGE OF REPRODUCED IMAGE

CROSS-REFERENCE TO RELATED APPLICATIONS

The priority application Number JP2004-068299 upon which this patent application is based is hereby incorporated by reference.

BACKGROUND OF THE INVENTION

The present invention relates to an image-signal processing apparatus for enhancing a specific frequency component of an image signal and correcting the edge of a reproduced image.

One of image-quality control is edge correction for enhancing the edge of an image. FIGS. 1A, 1B, and 1C are schematic charts of signal waveforms for explaining the principle of edge correction. FIG. 1A shows the waveform of a luminance signal that is an original image signal. FIG. 1B shows the waveform of an edge enhanced signal according to the quadratic differential waveform of the original image signal. The edge enhanced signal is a signal in which the polarity of the original image signal is inverted after quadratic differentiation. The edge enhanced signal waves greatly at the rising and falling of the luminance signal, or at the edge of the image. FIG. 1C shows the waveform of an image signal subjected to edge correction, which is generated by combining the original image signal of FIG. 1A and the edge enhanced signal of FIG. 1B. The waveform of the image signal subjected to edge enhancement is corrected so as to fall once, then rise, and return after exceeding a specified level, at the rising of the original image signal. Thus, the edge of the image is enhanced to improve the distinctness of the image.

FIG. 2 is a schematic block diagram of a conventional edge-enhanced-signal generation circuit for generating an edge enhanced signal. A frequency component of an inputted signal in a specific band (for example, around 1.5 MHz) is extracted by a band pass filter (BPF) 2. The extraction process tends to generate a noise pulse. A coring circuit 4 is provided to eliminate the noise The coring circuit 4 allows only pluses whose amplitude exceeds a specified threshold to pass through and eliminates pulses below it as noise. The pulses that have passed through the coring circuit 4 are multiplied by a specified gain in a gain circuit 6, where the quadratic differential waveform is provided with an amplitude responding to the sharpness of the rising and falling of the luminance signal. Briefly, the sharper the edge of the original image is, the higher the degree of the edge enhancement becomes. However, excessive edge enhancement makes the image unnatural. A clipping circuit 8 is provided to prevent it. When the amplitude of the quadratic differential waveform that is subjected to gain control by the gain circuit 6 exceeds a set upper limit and lower limit, the clipping circuit 8 clips the waveform at the upper limit and the lower limit.

In addition to the edge enhancement, the luminance signal is subjected to tone correction by nonlinear transformation according to the characteristics of the display and the luminance distribution of pixels that make up the image so that the reproduced image is given visually preferable gradation. Known tone correction includes gamma correction, in which a low-luminance portion is enhanced and a high-luminance portion is made inconspicuous. There are several methods of edge enhancement in connection with the gamma correction.

In a first method, an edge enhanced signal is combined with a luminance signal and is then subjected to gamma correction. In this method, the high-luminance side and the low-luminance side of the image signal are asymmetrical in the effect of the edge correction under the influence of the gamma correction. More specifically, even if the way of rising of the luminance signal is the same in the original image signal, edge enhancement becomes relatively low when the rising occurs in a high-luminance region, while edge enhancement becomes relatively high in a low-luminance region. This poses the problem that the difference in the degree of enhancement depends on the gamma correction, resulting in a visually unnatural image.

In a second method, an edge enhanced signal is generated from an original luminance signal and combined with a luminance signal subjected to gamma correction. In this method, even if the way of rising of the luminance signal is the same in the original image signal, a change in the level of the luminance signal is relatively low when the rising occurs in a high-luminance region, while it is relatively high in a low-luminance region as a result of gamma correction. On the other hand, the edge enhanced signal is not influenced by the gamma correction to be at the same level irrespective of the luminance region where the signal rises. Briefly, this poses the problem that edge enhancement for the rising amount of the luminance signal is relatively high at a high-luminance region, while it is relatively low in a low-luminance region, also resulting in a visually unnatural image.

In a third method, an edge enhanced signal is generated from an image signal subjected to gamma correction. Accordingly, the level of noise pulses generated by differentiation of the BPF 2 varies depending on the level of the luminance signal. Specifically, the noise level is relatively low in the high-luminance region, while it is relatively high on the low-luminance region. This poses the problem that noise cannot be eliminated correctly by the coring circuit 4 that has a fixed threshold.

It is known in the art to provide a method described in JP-A-2003-32513 as a conventional method in which the problems of the above methods are solved. FIG. 3 is a schematic block diagram of a luminance-signal generation circuit for applying edge enhancement to a luminance signal by the conventional method. This circuit includes a main path for generating a gamma-corrected luminance signal from a image signal inputted by an image-pickup device etc. and an edge-enhanced-signal generating section 20 arranged in parallel with the main path, for generating an edge enhanced signal from the image signal. In the main path, a luminance signal Y is extracted by a low pass filter (Y-LPF) 22 and subjected to gamma correction by a Y-signal gamma correction circuit 24. In the edge-enhanced-signal generating section 20, an edge-signal generation circuit 26 with the same structure as that of the edge-enhanced-signal generation circuit shown in FIG. 2 extracts a specific frequency component corresponding to the edge to generate an edge signal. The edge signal is subjected to gamma correction different from the gamma correction by the main path to generate an edge enhanced signal. A combining circuit 28 combines the edge enhanced signal with the luminance signal outputted from the main path to output an output image signal subjected to edge correction.

The edge-enhanced-signal generating section 20 generates an edge enhanced signal as follows: The output signal from the edge-signal generation circuit 26 loses luminance information through the elimination of a direct current component, and so cannot be subjected to gamma correction in this state. Accordingly, an LPF (A-LPF 30) extracts a luminance signal from the image signal and then the luminance signal is combined with the edge signal outputted from the edge-signal generation circuit 26. The composite signal is subjected to gamma correction and so a signal in which the luminance signal subjected to edge-signal gamma correction is combined with an edge signal component subjected to edge-signal gamma correction is provided. Of the signal in which the two components are combined, an edge enhanced signal is a component arising from the edge signal. Accordingly, in combining the edge signal with the luminance signal, the edge-enhanced-signal generating section 20 generates two kinds of composite signals, a signal in which the edge signal and the luminance signal are added with an combining circuit 32 and a signal in which the edge signal is subtracted from the luminance signal with a subtracting circuit 34. The output of the combining circuit 32 is subjected to gamma correction by an edge-signal gamma correction circuit 36, while the output of the subtracting circuit 34 is subjected to gamma correction by an edge-signal gamma correction circuit 38. A subtracting circuit 40 subtracts the output of the edge-signal gamma correction circuit 38 from the output of the edge-signal gamma correction circuit 36, so that the luminance signal components in the outputs are cancelled, and so only a component arising from the edge signal is extracted as an edge enhanced signal.

With the conventional circuit of FIG. 3, the luminance signal and the edge signal can be gamma corrected on the basis of different transfer characteristic functions, facilitating the provision of a visually preferable reproduced image. On the other hand, the conventional circuit also has the problem that the structure of the edge-enhanced-signal generating section 20 is complicated and so the circuit becomes large in scale.

SUMMARY OF THE INVENTION

The present invention is made to solve the above problems. Accordingly, it is an object of the invention to provide an image-signal processing apparatus in which visually preferable edge enhancement is performed with a simple circuit configuration irrespective of the level of the luminance signal.

DESCRIPTION OF PREFERRED EMBODIMENT

First, basic aspect of an image-signal processing apparatus according to a preferred embodiment of the present invention will be outlined.

A basic configuration of the image-signal processing apparatus according to one aspect of the invention comprises an edge-signal generation circuit for extracting a specific frequency component corresponding to the edge from an original image signal to generate an edge signal, a gain-signal generation circuit for generating a gain signal according to the level of the original image signal, and an edge-enhanced-signal generation circuit for converting the amplitude of the edge signal according to the gain signal to generate an edge enhanced signal for correcting the edge of the reproduced image.

One example of the edge-signal generation circuit comprises a frequency filter circuit for extracting the specific frequency component from the original image signal, and a noise elimination circuit for eliminating waveforms whose peak is lower than a specified reference value from the output signal of the frequency filter circuit, wherein the edge signal is generated according to the output signal of the noise elimination circuit.

In one example of the gain-signal generation circuit, a nonlinear gain definition function is set in advance, and the level of the gain signal corresponding to the level of the original image signal is determined on the basis of the gain definition function.

One example of the edge-enhanced-signal generation circuit comprises a multiplying circuit for generating the edge enhanced signal by multiplying the edge signal by the gain signal.

Another configuration of the image-signal processing apparatus further comprises a tone correction circuit for applying tone correction based on a nonlinear characteristic to the original image signal, and an adding circuit for adding the edge enhanced signal to the original image signal subjected to the tone correction to generate an output image signal.

With the image-signal processing apparatus, the process of converting the amplitude of the edge signal extracted at the edge of an image according to the level of the original image signal at the extraction position to obtain an edge enhanced signal does not include the process of combining the edge signal and the original image signal together and the process of eliminating the original image signal component from the combined signal. Briefly, the edge signal is converted in amplitude according to the gain signal as it is to generate an edge enhanced signal. This simplifies the process of generating an edge enhanced signal, thus offering the advantage of simplifying the circuit configuration for generating the edge enhanced signal.

The details of the embodiment of the invention will be described below with reference to the drawings.

Figure 4:
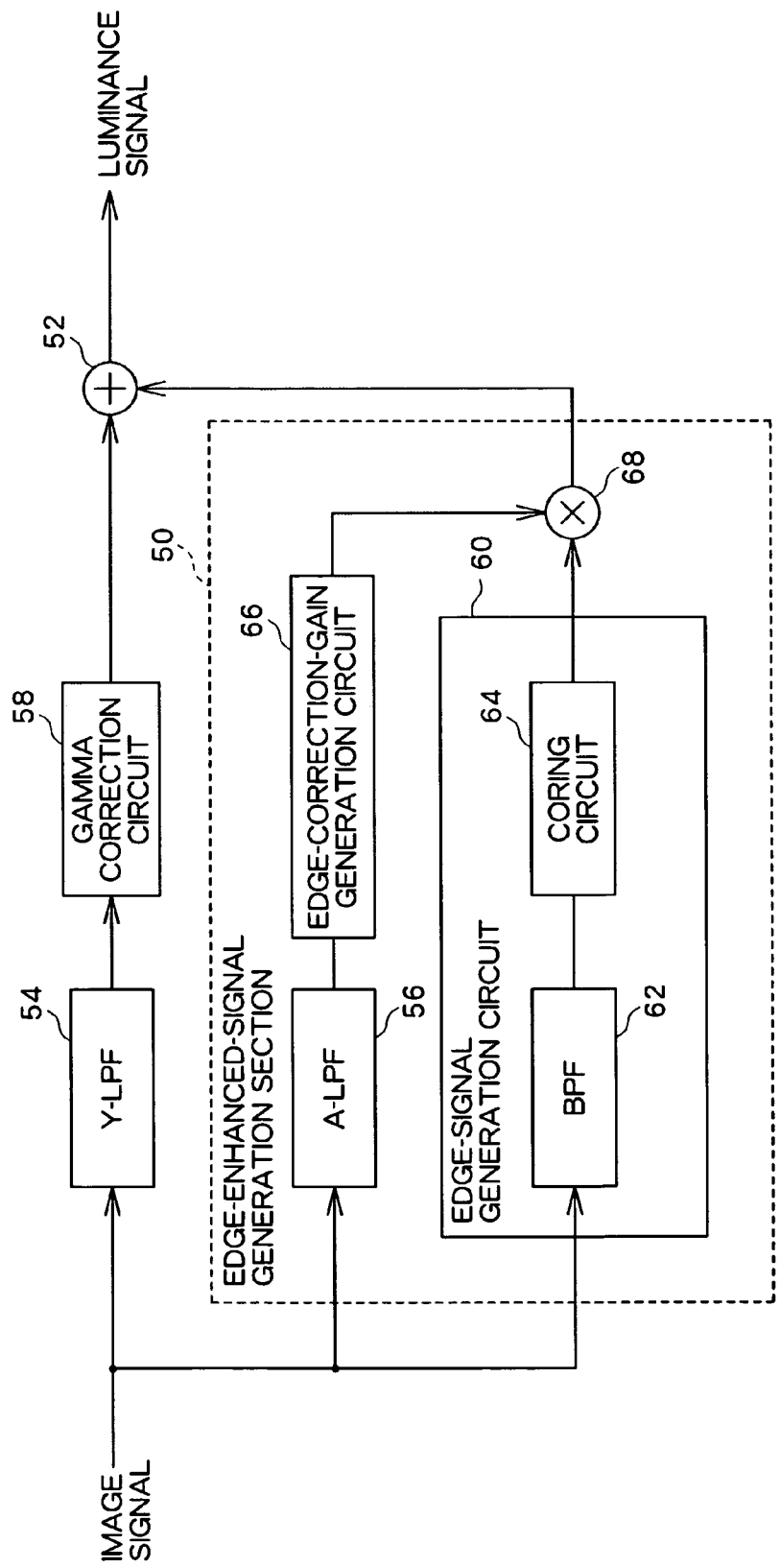
FIG. 4 is a schematic block diagram of a luminance-signal generation circuit according to an embodiment of the invention.

FIG. 4 is a schematic block diagram of a luminance-signal generation circuit according to an embodiment of the invention. The circuit includes an edge-enhanced-signal generation circuit 50. The edge-enhanced-signal generation circuit 50 is arranged in parallel with a main path for generating a gamma-corrected luminance signal from a image signal (an original image signal) inputted by an image-pickup device etc, and generates an edge enhanced signal from the image signal. The edge-enhanced-signal generation circuit combines the luminance signal outputted from the main path with the edge enhanced signal outputted from the edge-enhanced-signal generation circuit 50 in the combining circuit 52 to output an edge-corrected luminance signal as an output image signal.

Figure 5:
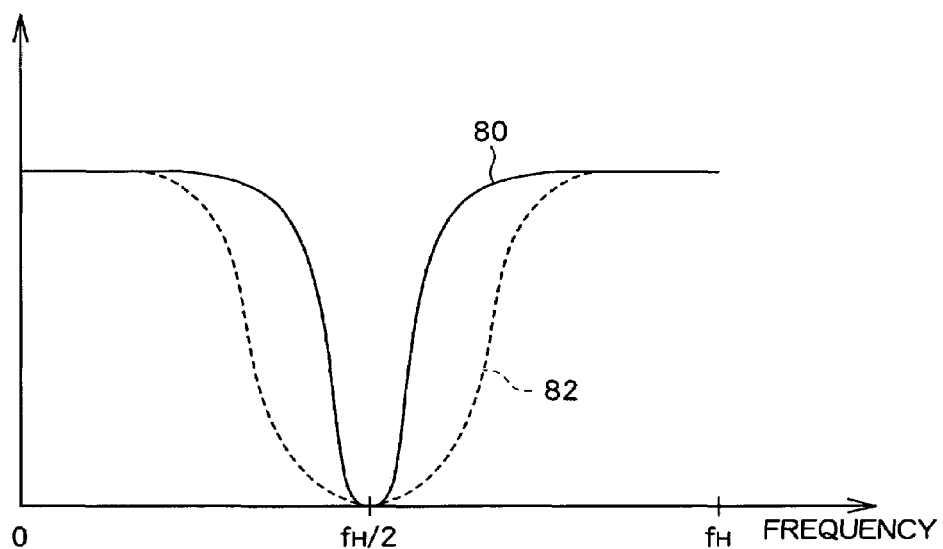
FIG. 5 is a frequency response diagram in which the respective transmission characteristics of a Y-LPF and an A-LPF are shown.

The image signal inputted by the image-pickup device etc. is a signal in which a luminance signal and a color signal are frequency multiplexed. An LPF 54 (hereinafter, referred to as a Y-LPF) provided in the main path and an LPF 56 (hereinafter, referred to as an A-LPF) provided in the edge-enhanced-signal generation circuit 50 both extract a luminance-signal component from the image signal. FIG. 5 is a frequency response diagram in which the respective transmission characteristics of the Y-LPF 54 and the A-LPF 56 are shown. Both of the filter circuits have the minimal value at a half of a horizontal sampling frequency $f_H$, in the vicinity of which they attenuate the output signals. The characteristic 80 of the Y-LPF 54 is set to have a sharp attenuation characteristic not to decrease the resolution of the luminance signal by filtering. The characteristic 82 of the A-LPF 56 is set to have a gentler attenuation characteristic than that of the characteristic 80 of the Y-LPF 54. This is intended to prevent a kind of moiré noise called a jaggy from entering to the luminance signal used in the edge-enhanced-signal generation circuit 50. Alternatively, without the use of the A-LPF 56, the output of the Y-LPF 54 may be provided to the edge-enhanced-signal generation circuit 50, with which edge-enhanced-signal generation process may be performed so that the circuit configuration is simplified.

Figure 6:
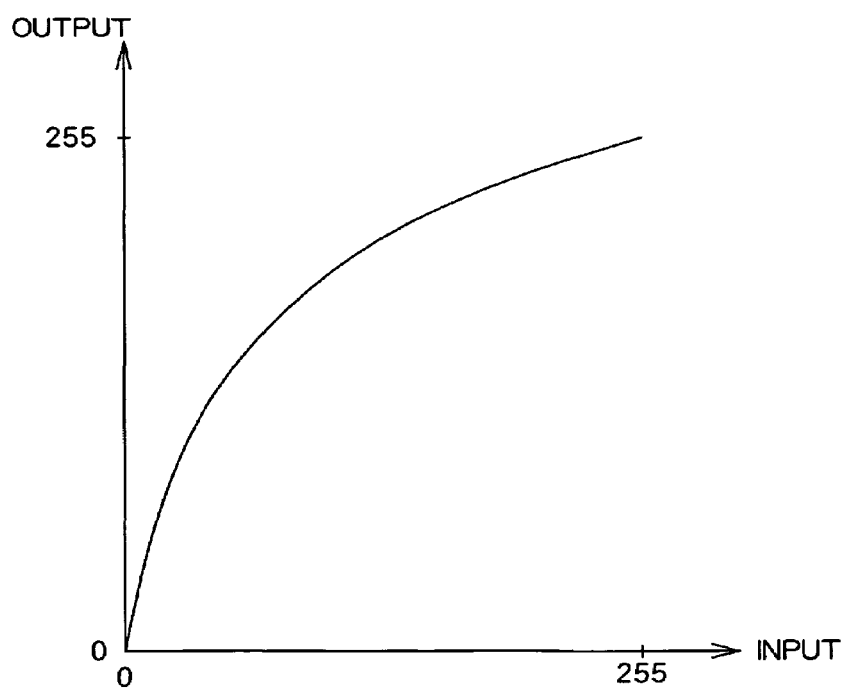
FIG. 6 is a schematic graph in which an example of a transfer characteristic function set for a gamma correction circuit is shown.

The main path includes the Y-LPF 54 and a gamma correction circuit 58 for gamma-correcting the output thereof. FIG. 6 is a schematic graph in which an example of a transfer characteristic function set for the gamma correction circuit 58 is shown, which plots input levels in abscissa and output levels in ordinate. The input data and the output data each have eight bits, in which the values vary in the range of 0 to 255. As shown in the drawing, the gamma correction circuit 58 is a nonlinear transfer circuit, in which the transfer characteristic function has a large inclination in the range of low input levels and has a small inclination in the range of high input levels. The transfer characteristic function is set in advance in the gamma correction circuit 58 using a translation table or numerical expression. In the case of using a translation table, the output levels are registered in the table for each of the digitized input levels. In the case of calculating an output level from an input level using a numerical expression, for example, the transfer characteristic functions of the multiple sections of the input level are linearly approximated and parameters indicative of the lines are registered in the gamma correction circuit 58. The registration for the table and the parameters is achieved by storing the data in a memory. In the case of using the table, the gamma correction circuit 58 generates an address responsive to the input level, reads an output level stored in the address of the memory, and outputs it. In the case of calculating an output level using a numerical expression designated for each section of the input level, the gamma correction circuit 58 determines to which section the input level belongs, reads the parameter of the numerical expression corresponding to the section, and calculates the output level using the parameter.

Figure 1A:
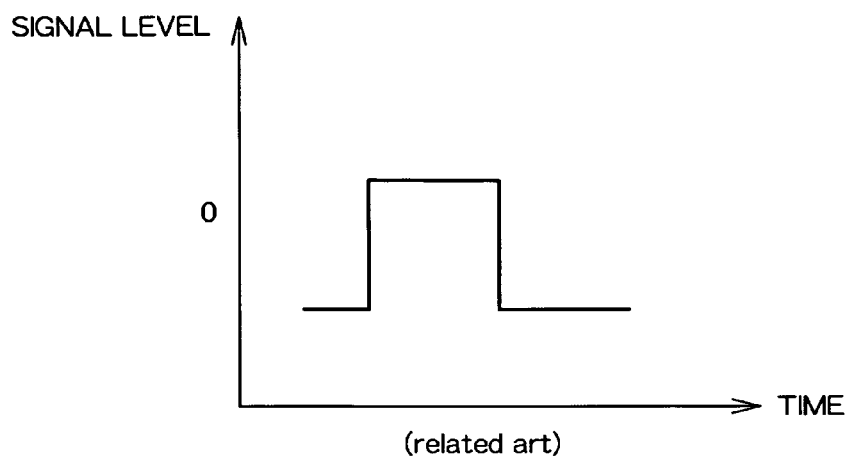
FIG. 1A is a schematic chart in which the waveform of a luminance signal that is an original image signal is shown.
Figure 1B:
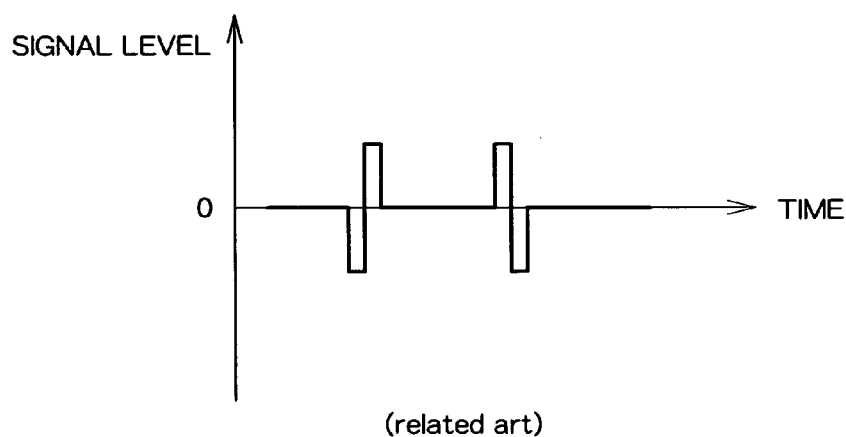
FIG. 1B is a schematic chart in which the waveform of an edge enhanced signal according to the quadratic differential waveform of the original image signal is shown.
Figure 1C:
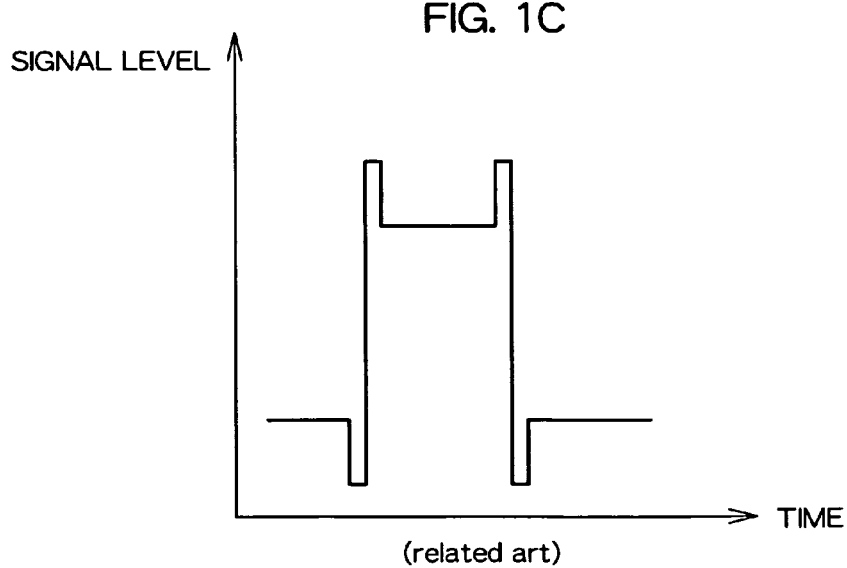
FIG. 1C is a schematic chart in which the waveform of an image signal subjected to edge correction is shown.
Figure 2:
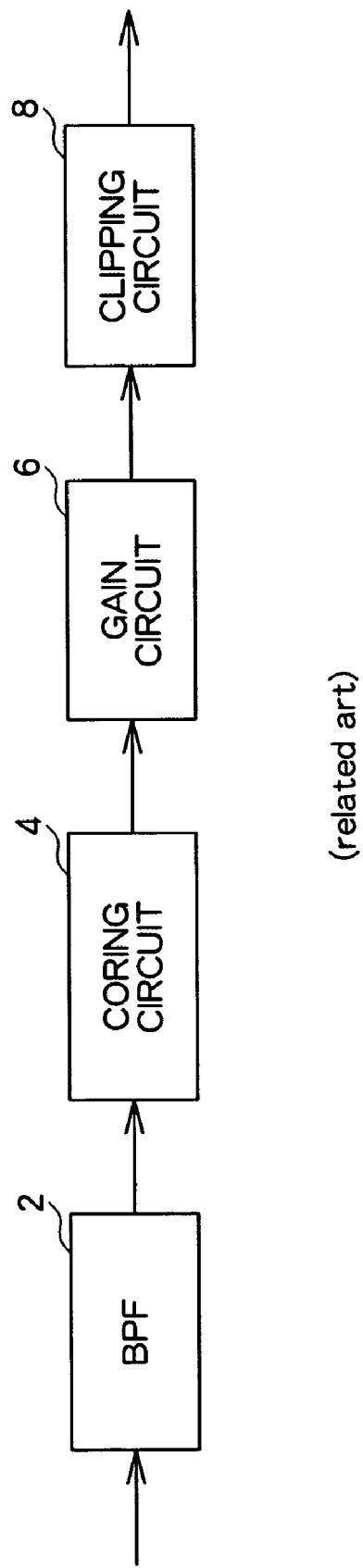
FIG. 2 is a schematic block diagram of a conventional edge-enhanced-signal generation circuit for generating an edge enhanced signal.
Figure 3:
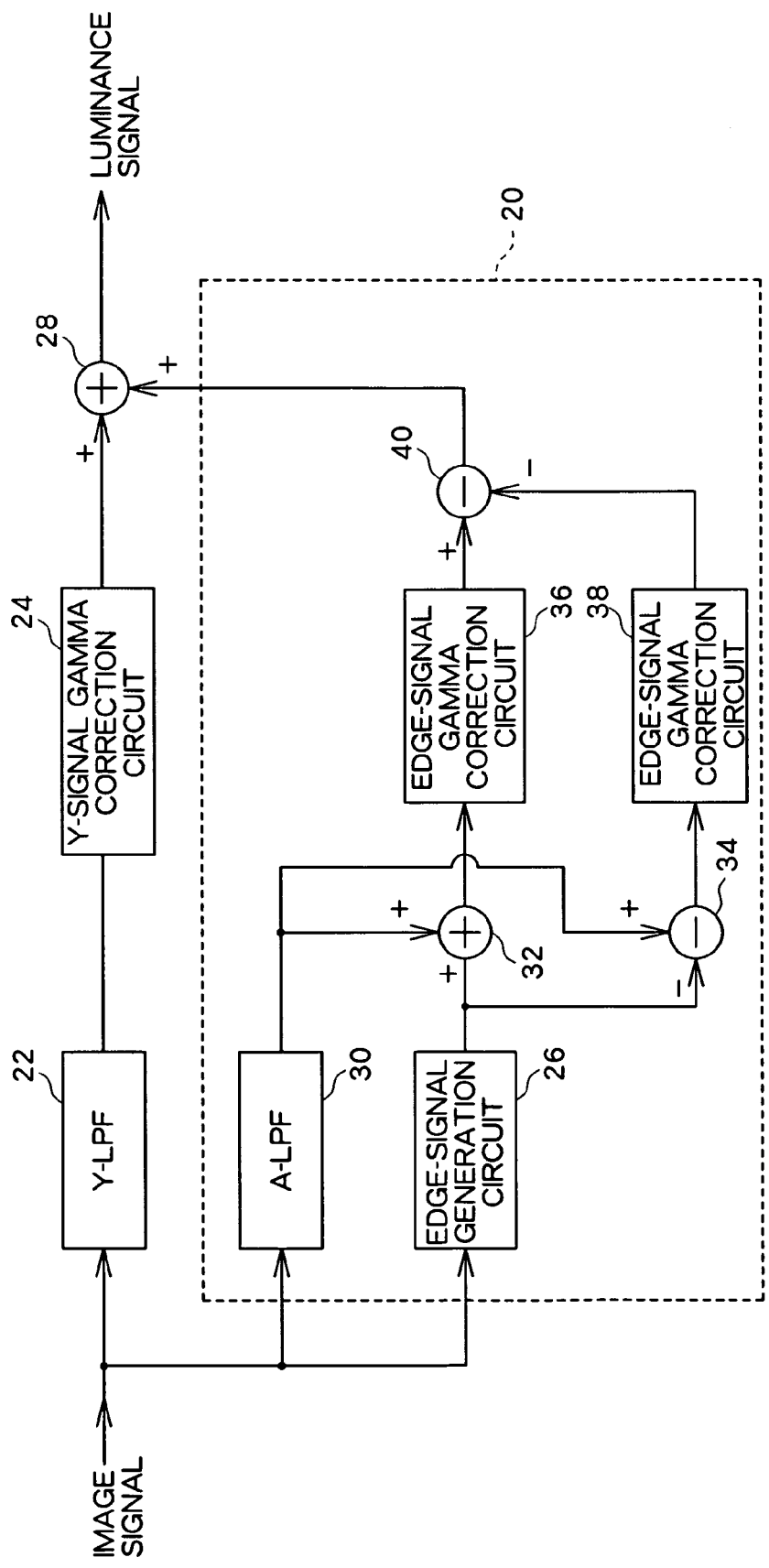
FIG. 3 is a schematic block diagram of a conventional luminance-signal generation circuit for applying gamma correction and edge enhancement to a luminance signal by a conventional method.

In the edge-enhanced-signal generation circuit 50, the image signal is inputted to the A-LPF 56 and an edge-signal generation circuit 60. The edge-signal generation circuit 60 includes a BPF 62 and a coring circuit 64. The BPF 62 extracts a frequency component in a specific band (for example, around 1.5 MHz) from the original image signal to generate the quadratic differential waveform of the image signal. Here the quadratic differential waveform becomes large in the portion where a gap is produced in the luminance, or at the edge of the image, so that an edge signal indicative of the edge can be produced by using the quadratic differential waveform. The coring circuit 64 allows only pluses whose amplitude exceeds a specified threshold to pass through. In the extraction process by the BPF 62, noise pulses are produced as a quadratic differential waveform caused by random noise contained in the image signal. The coring circuit 64, in which a threshold corresponding to the height of the noise pulse, eliminates pulses of the output signal of the BPF 62, which are lower than the threshold, as noise. The signal from which noise is eliminated by the coring circuit 64 is outputted as an edge signal from the edge-signal generation circuit 60. The quadratic differential waveform has an amplitude corresponding to the sharpness of the rising and falling of the luminance signal. Briefly, the sharper the edge of the original image is, the higher the degree of the edge enhancement becomes. However, excessive edge enhancement makes the image unnatural. The edge-signal generation circuit 60 may be provided with a clipping circuit to prevent it, as in the conventional circuit shown in FIG. 2. so that when the amplitude of the quadratic differential waveform exceeds a set upper limit, the clipping circuit can clip the waveform at the upper limit.

The A-LPF 56 of the edge-enhanced-signal generation circuit 50 extracts a luminance signal component from the image signal, as described above. An edge-correction-gain generation circuit 66 generates an edge correction gain G on the basis of the level of the luminance signal inputted from the A-LPF 56. Specifically, the edge-correction-gain generation circuit 66, in which a transfer characteristic function is set, converts the luminance signal level to the edge correction gain G on the basis of the function. The transfer characteristic function is set in advance in the edge-correction-gain generation circuit 66 using, e.g., a translation table or numerical expression. A nonlinear transfer characteristic can also be set. In the case of using a translation table, the gain G is registered in the table for each digitized input level. In the case of calculating an output level from an input level using a numerical expression, the transfer characteristic functions of the multiple sections of the input level are linearly approximated and parameters indicative of the lines are registered in the edge-correction-gain generation circuit 66. The registration for the table and the parameters is achieved by storing the data in a memory. In the case of using the table, the edge-correction-gain generation circuit 66 generates an address responsive to the input level, reads a gain stored in the address of the memory, and outputs it. In the case of calculating a gain using a numerical expression designated for each section of the input level, the edge-correction-gain generation circuit 66 determines to which section the input level belongs, reads the parameter of the numerical expression corresponding to the section, and calculates the gain using the parameter.

The edge signal outputted from the edge-signal generation circuit 60 and the edge correction gain G outputted from the edge-correction-gain generation circuit 66 are inputted to a multiplying circuit 68. The multiplying circuit 68 multiplies the edge signal by the edge correction gain G to generate an edge enhanced signal. The obtained edge enhanced signal is outputted from the edge-enhanced-signal generation circuit 50 and combined with the luminance signal subjected to gamma correction by a combining circuit 52, as described above.

Figure 7:
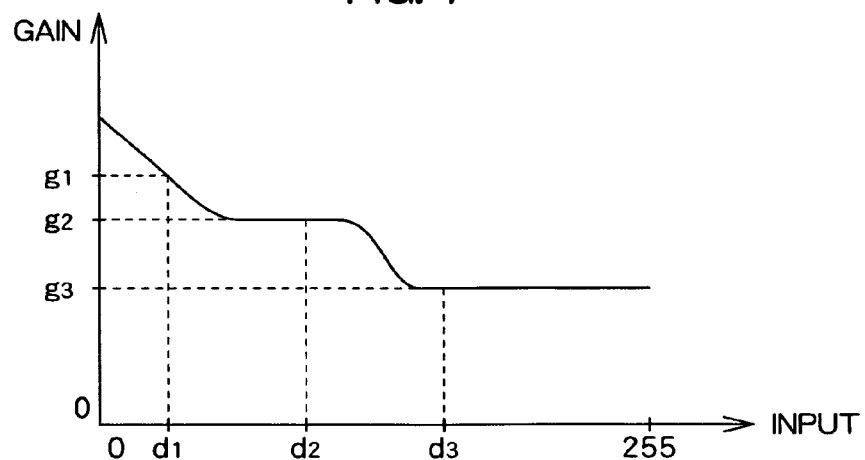
FIG. 7 is a schematic graph in which an example of a transfer characteristic function set for an edge-correction-gain generation circuit is shown.
Figure 8:
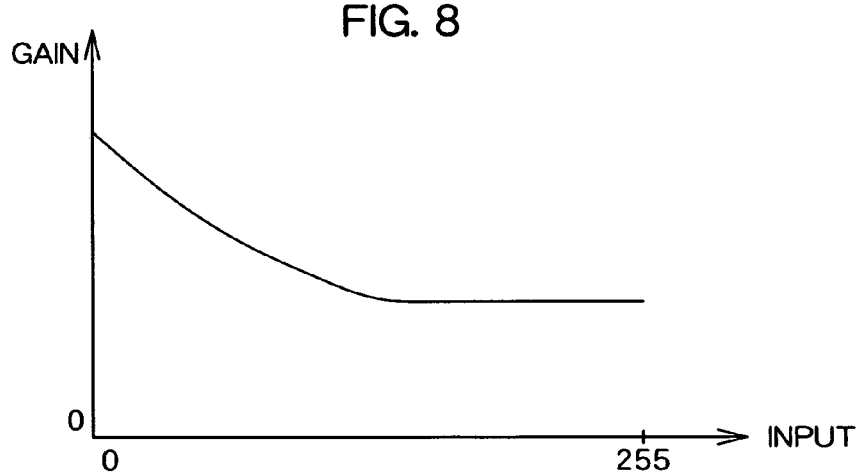
FIG. 8 is a schematic graph in which another example of a transfer characteristic function set for an edge-correction-gain generation circuit is shown.

The operation of the luminance-signal generation circuit will now be described. FIGS. 7 and 8 are schematic graphs in which examples of a transfer characteristic function set for the edge-correction-gain generation circuit 66 are shown, which plot inputted luminance-signal levels in abscissa and edge correction gains G that are output values in ordinate. The luminance signal level can vary in the range, for example, from 0 to 255. The transfer characteristic function can be set so that the quality of an image produced by the signal of a combination of the edge enhanced signal and the gamma-corrected luminance signal becomes high. For example, the transfer characteristic function can be set in association with the inclination of the transfer characteristic function for gamma correction. For example, the transfer characteristic functions of FIGS. 7 and 8 are obtained by controlling the gamma correction characteristic shown in FIG. 6 such that the gain G is set large in the vicinity of a low input level where the inclination of the gamma correction characteristic is large so that the edge of the image can be enhanced relatively greatly, while the gain G is set small in the vicinity of a high input level where the inclination of the gamma correction characteristic is small so that the edge is not excessively enhanced relative to gradation change.

Figure 9:
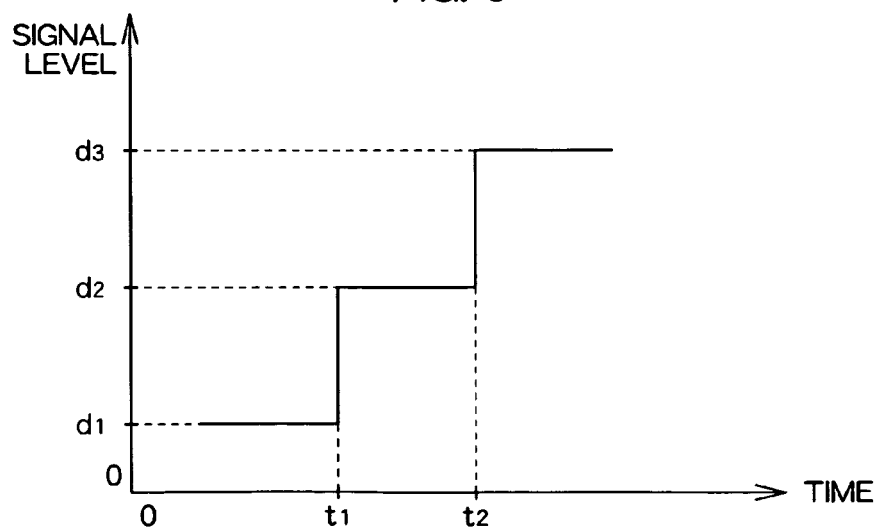
FIG. 9 is a schematic chart of the waveform of a image signal inputted to an edge-enhanced-signal generation circuit.

FIG. 9 is a schematic chart of the waveform of a image signal inputted to the edge-enhanced-signal generation circuit 50, showing a waveform in which the luminance increases by step P from level $d_1$ to $d_2$ at time $t_1$ and from $d_2$ to $d_3$ at time $t_2$. This chart plots time in abscissa and a signal level in ordinate. The image signal is a time-series signal obtained by scanning an image along a specified scanning line. The time in abscissa corresponds to the spatial position along the scanning line in the image. This also applies to FIGS. 10 to 12.

Figure 10:
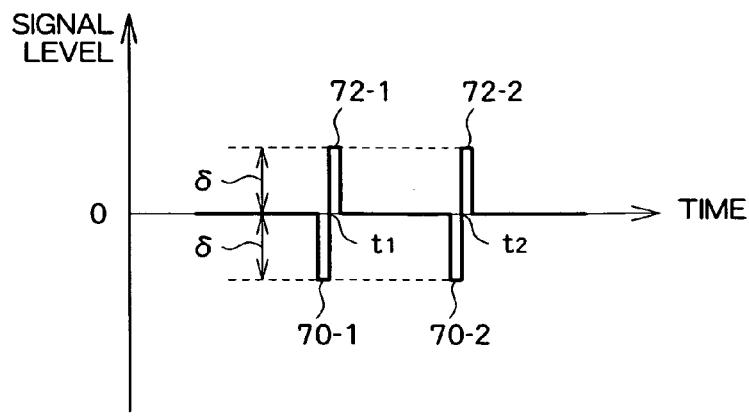
FIG. 10 is a schematic chart of the waveform of an edge signal outputted from an edge-signal generation circuit in correspondence with the waveform of the image signal of FIG. 9.

FIG. 10 is a schematic chart of the waveform of an edge signal outputted from the edge-signal generation circuit 60 in correspondence with the waveform of the image signal of FIG. 9. Here the ways of risings in two steps of the original image signal are similar, in which undershoots 70-1 and 70-2 and overshoots 72-1 and 72-2 of a size δ are generated as an edge signal at both times $t_1$ and $t_2$. While the chart shows the edge signal as a waveform in which the value varies only in one point, for convenience of description, the waveform is an ideal waveform obtained by extracting only a specific frequency component. In actuality, since the BPF 62 extracts frequency components of some band width, the overshoot and undershoot of the edge signal, which appear at the edge of the image, are smoothed around peak points to some extent, thus forming an expanding waveform.

Let the levels of signals inputted from the A-LPF 56 to the edge-correction-gain generation circuit 66 at the timing of undershoots 70-1 and 70-2 and overshoots 72-1 and 72-2 be $d_{D1}$, $d_{D2}$, $d_{U1}$, and $d_{U2}$, and the gains G corresponding to the signal levels be $g_{D1}$, $g_{D2}$, $g_{U1}$, and $g_{U2}$, respectively. An example in which the transfer characteristic function of FIG. 7 is set for the edge-correction-gain generation circuit 66 will be described below. Assuming that the gains G corresponding to signal levels $d_1$ to $d_3$ are $g_1$ to $g_3$, relational expression $g_1 > g_2 > g_3$ holds, where $$d_1 \leq d_{D1}, d_{U1} \leq d_2, d_2 \leq d_{D2}, d_{U2} \leq d_3, \quad (1)$$

Accordingly, gains $g_{D1}$, $g_{D2}$, $g_{U1}$, and $g_{U2}$ are inputted from the edge-correction-gain generation circuit 66 to the multiplying circuit 68 at the timing at which undershoots 70-1 and 70-2 and overshoots 72-1 and 72-2 are inputted from the edge-signal generation circuit 60 to the multiplying circuit 68, where $$g_1 \geq g_{D1}, g_{U1} \geq g_2, g_2 \geq g_{D2}, g_{U1} \geq g_3, \quad (2)$$

The equal signs in expressions (1) and (2) hold when the smoothing of the image signal by the A-LPF 56 is ignored.

Figure 11:
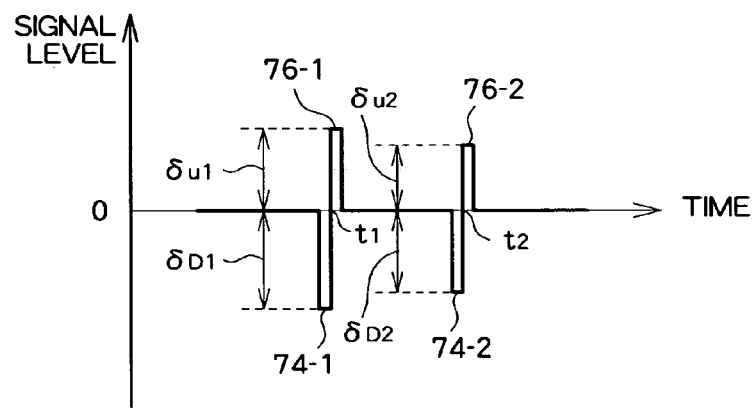
FIG. 11 is a schematic chart of the waveform of an edge enhanced signal generated by a multiplying circuit.

FIG. 11 is a schematic chart of the signal waveform of an edge enhanced signal generated by the multiplying circuit 68. Undershoots 74-1 and 74-2 and overshoots 76-1 and 76-2 of FIG. 11 correspond to the undershoots 70-1 and 70-2 and overshoots 72-1 and 72-2. The heights of the undershoots 74-1 and 74-2 and overshoots 76-1 and 76-2 are multiplied by the gain by the multiplying circuit 68, thus being translated to $\delta_{D1}$, $\delta_{D2}$, $\delta_{U1}$, and $\delta_{U1}$, respectively, from the height δ when the edge signal is outputted from the edge-signal generation circuit 60. Here relational expressions $\delta_{D1} > \delta_{D2}$ and $\delta_{U1} > \delta_{U2}$ hold because of the difference in gain G caused by the difference in the level of the image signal in the vicinity of time $t_1$ and in the vicinity of time $t_2$.

Figure 12:
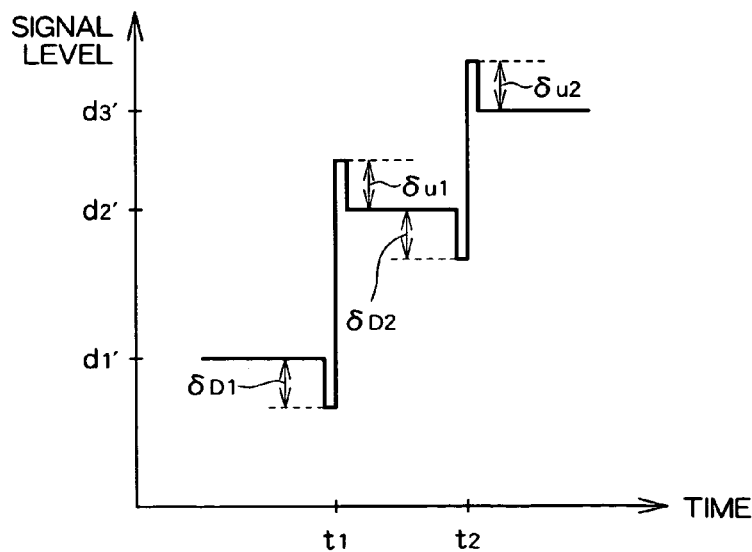
FIG. 12 is a schematic chart of the waveform of an output signal of a combining circuit.

FIG. 12 is a schematic chart of the waveform of an output signal of the combining circuit 52. The signal waveform is a combination of the output signal from the gamma correction circuit 58 for the image signal of FIG. 9 and the edge enhanced signal of FIG. 11. Here, $d_1'$, $d_2'$, and $d_3'$ are the signal levels after gamma correction by the gamma correction circuit 58 relative to input signal levels $d_1$, $d_2$, and $d_3$, respectively.

The use of the luminance-signal generation circuit allows the amplitude of the edge enhanced signal to be set independently from the gamma correction for the luminance signal component. For example, in high-luminance region, the inclination of the transfer characteristic curve of gamma correction is decreased, so that the gradation is compressed. However, highlight detail processing can be achieved to provide a distinct image by setting the gain signal of the edge-correction-gain generation circuit 66 by which the edge signal is multiplied larger than the inclination of the gamma correction. On the other hand, for a low-luminance region, noise can be decreased by setting the gain signal smaller than the inclination of the gamma correction. The luminance-signal generation circuit can achieve such flexible generation of edge enhanced signals with a simple structure.

The foregoing structure prevents edge enhancement of noise in such a way that the edge-signal generation circuit 60 is provided with the coring circuit 64 to eliminate pulses below a specified threshold. However, in place of using the coring circuit 64, a transfer characteristic function may be set for the edge-correction-gain generation circuit 66 such that the gain becomes, for example, zero at an input signal level lower than that corresponding to the threshold set for the coring circuit 64.

Another calculation circuit may be provided in place of the multiplying circuit 68 so that the edge-correction-gain generation circuit can generate a translation parameter used in the calculation circuit as a gain signal. For example, an adding circuit may be provided as the calculation circuit. In this case, the edge-correction-gain generation circuit 66, in which the range of the input signal from the A-LPF 56 is divided into multiple sections, outputs a specified gain signal to each section, and the adding circuit adds the gain to the edge signal outputted from the edge-signal generation circuit 60, and it is outputted as an edge enhanced signal.

What is claimed is:

1. An image-signal processing apparatus for enhancing a specific frequency component of an image signal and correcting the edge of a reproduced image, the apparatus comprising:
   a tone correction circuit for applying tone correction based on a nonlinear characteristic to the original image signal;
   an edge-signal generation circuit for extracting a specific frequency component corresponding to the edge from the original image signal to generate an edge signal;
   a gain-signal generation circuit for generating a gain signal according to the level of the original image signal;
   an edge-enhanced-signal generation circuit for converting the amplitude of the edge signal according to the gain signal to generate an edge enhanced signal for correcting the edge of the reproduced image; and
   an adding circuit for adding the edge enhanced signal to the original image signal subjected to the tone correction to generate an output image signal.

2. The image-signal processing apparatus according to claim 1, wherein
   the edge-signal generation circuit comprises:
   a frequency filter circuit for extracting the specific frequency component from the original image signal; and
   a noise elimination circuit for eliminating waveforms whose peak is lower than a specified reference value from the output signal of the frequency filter circuit, wherein
   the edge signal is generated according to the output signal of the noise elimination circuit.

3. The image-signal processing apparatus according to claim 1, wherein, in the gain-signal generation circuit,
   a nonlinear gain definition function in association with the nonlinear characteristics of the tone correction circuit is set in advance, and
   the level of the gain signal corresponding to the level of the original image signal is determined on the basis of the gain definition function.

4. The image-signal processing apparatus according to claim 1, wherein
   the edge-enhanced-signal generation circuit comprises a multiplying circuit for generating the edge enhanced signal by multiplying the edge signal by the gain signal.

5. The image-signal processing apparatus according to claim 1, further comprising a low-pass filter circuit for extracting a luminance signal component contained in the original image signal, wherein
   the tone correction circuit applies the tone correction to the luminance signal outputted from the low-pass filter circuit.

6. The image-signal processing apparatus according to claim 1, further comprising a low-pass filter circuit for extracting a luminance signal component contained in the original image signal, wherein
   the gain-signal generation circuit generates the gain signal according to the level of the luminance signal outputted from the low-pass filter circuit.

7. The image-signal processing apparatus according to claim 1, further comprising:
   a first low-pass filter circuit for extracting a luminance signal component contained in the original image signal;
   a second low-pass filter circuit having a cutoff frequency lower than that of the first low-pass filter circuit and extracting a luminance signal component contained in the original image signal; wherein
   the tone correction circuit applies the tone correction to the luminance signal outputted from the first low-pass filter circuit;
   the adding circuit adds the edge enhanced signal to the luminance signal subjected to the tone correction to generate an output image signal,
   the gain-signal generation circuit generates the gain signal according to the level of the luminance signal outputted from the second low-pass filter circuit.

8. An image-signal processing apparatus for enhancing a specific frequency component of an image signal and correcting the edge of a reproduced image, the apparatus comprising:
   an edge-signal generation circuit for extracting a specific frequency component corresponding to the edge from the original image signal to generate an edge signal;
   a gain-signal generation circuit for generating a gain signal according to the level of the original image signal;
   an edge-enhanced-signal generation circuit for converting the amplitude of the edge signal according to the gain signal to generate an edge enhanced signal for correcting the edge of the reproduced image;
   a first low-pass filter circuit for extracting a luminance signal component contained in the original image signal;
   a second low-pass filter circuit having a cutoff frequency lower than that of the first low-pass filter circuit and extracting a luminance signal component contained in the original image signal;
   a tone correction circuit for applying tone correction to the luminance signal outputted from the first low-pass filter circuit; and
   an adding circuit for adding the edge enhanced signal to the luminance signal subjected to the tone correction to generate an output image signal, wherein
   the gain-signal generation circuit generates the gain signal according to the level of the luminance signal outputted from the second low-pass filter circuit.

* * * * *